United States Patent [19]

Nakazato et al.

[11] Patent Number: 4,938,500
[45] Date of Patent: Jul. 3, 1990

[54] AIR BAG MOUNTING SYSTEM FOR MOTOR VEHICLES

[75] Inventors: Wataru Nakazato; Takashi Outsu, both of Tokyo, Japan

[73] Assignee: Fuji Jukogyo Kabushiki Kaisha, Tokyo, Japan

[21] Appl. No.: 321,800

[22] Filed: Mar. 10, 1989

[30] Foreign Application Priority Data

Mar. 25, 1988 [JP] Japan .............................. 63-39522[U]

[51] Int. Cl.⁵ .............................................. B60R 21/16
[52] U.S. Cl. ...................................... 280/731; 280/732
[58] Field of Search ................ 280/728, 730, 731, 732

[56] References Cited

U.S. PATENT DOCUMENTS

| | | | |
|---|---|---|---|
| 3,773,352 | 11/1973 | Radke | 280/731 |
| 3,827,715 | 8/1974 | Lynch | 280/731 |
| 3,895,823 | 7/1975 | Stephenson | 280/731 |
| 3,945,665 | 3/1976 | Tsutsumi et al. | 280/731 |
| 4,148,503 | 4/1979 | Shiratori et al. | 280/731 |

*Primary Examiner*—Kenneth R. Rice
*Attorney, Agent, or Firm*—Beveridge, DeGrandi & Weilacher

[57] ABSTRACT

A steering wheel for a vehicle comprises an outer wheel member, a boss plate arranged in a central hollow space of the wheel member, and a plurality of spoke members connecting the wheel member and the boss plate. The steering wheel is designed for having light weight and high rigidity and for mounting an air bag unit thereon. The spoke members are integrally formed with the boss plate at their inner ends. The boss plate and the spoke members are provided with continuous flange portions along their edges. The boss plate is further provided with side flanges each disposed between base portions of a pair of adjoining spoke members and each extending along one lateral edge of the boss plate. Each of the side flanges has a width larger than that of the other flanges and bent behind the major plane of the boss plate with an angle, preferably a half of the right angle, with respect to the major plane of the boss plate, to constitute means for securing air bag unit.

11 Claims, 2 Drawing Sheets

ABAG MOUNTING SYSTEM FOR MOTOR VEHICLES

BACKGROUND OF THE INVENTION

The present invention relates to an air bag mounting system for motor vehicles and, more particularly, to a steering wheel for vehicles, particularly designed to have light weight and high rigidity and adapted to be easily equipped with an air bag unit used for security purposes in emergencies.

There have been proposed various kinds of steering wheels with the air bag unit to eliminate or reduce shocks given to the driver when the vehicle collides with another vehicle or structure such as a building. For this purpose, the air bag unit is mounted on the center of the steering wheel of the vehicle.

In one conventional example, an air bag module mount is provided on the steering wheel, and formed by die casting. In another example, the air bag module mounts made by an aluminum die-casting are secured to spokes connecting respective corner portions of a central boss plate and the steering wheel. Japanese Pat. Laid-open Publication (KOKAI) No. 54-93531 published July 24, 1979 discloses a steering wheel of the type described above.

However, the steering wheel of the above described type requires air bag module mounting members, made by die-casting, which are secured to the spokes by welding, so that assembly work is not easy.

Furthermore, the force applied to the driver operating a vehicle when it collides against another vehicle or a structure such as a building, is transmitted to the steering wheel through the air bag, so that it is necessary to make the spokes, particularly the upper ones highly rigid. To the contrary, the steering wheel must be made as light as possible for easy handling.

SUMMARY OF THE INVENTION

An object of this invention is to substantially eliminate the defects or drawbacks encountered in the conventional structures described above and to provide a steering wheel that is light and rigid and can rigidly mount an air bag unit without any specific air bag unit mounting members.

According to this invention, a steering wheel for a vehicle adapted to be equipped with an air bag unit comprises: an outer wheel; a boss plate having upper and lower flanges and a pair of side flanges; and a plurality of spoke members connecting said boss plate and the outer wheel; said spoke members having flange portions along the length thereof, said side flanges of the boss plate having a width larger than that of the other flange portions, said side flanges being angularly bent behind the major plane of the boss plate and having means for mounting the air bag unit.

In the steering wheel described above, the boss plate and the spoke members can be integrally formed of sheet metal having light weight. Further, continuous flanges on the boss plate and the spoke members serve to give high rigidity to the steering wheel. The air bag unit can be easily secured to the steering wheel from the front side, so that the checking of the mounting condition becomes easy, because the large width of the side flanges improves accessibility. Moreover, the air bag unit can be installed easily without using means such as welding.

A preferred embodiment of the present invention will become understood from the following detailed description referring to the accompanying drawings.

DESCRIPTION OF THE PREFERRED EMBODIMENT

Figure 3:
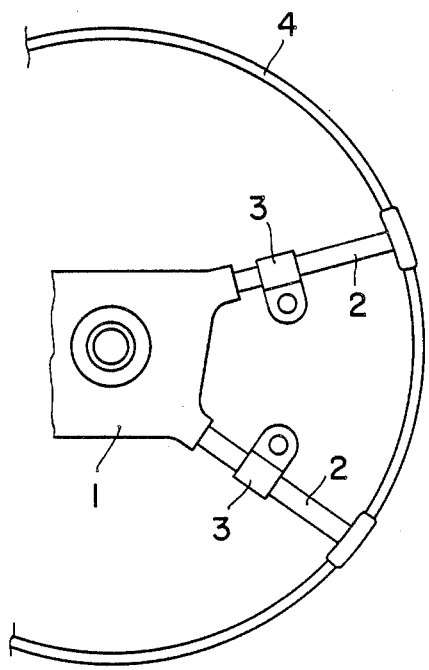
FIG. 3 is a view similar to FIG. 1, showing a conventional steering wheel.

For a better understanding of the present invention, one typical conventional example of a steering wheel adapted to mount an air bag unit will first be described with reference to FIG. 3 showing a front view of the steering wheel.

The steering wheel is provided with a boss plate 1 positioned in the central hollow space thereof, and two spokes 2 for each side of the wheel. These spokes have one ends secured to upper and lower (as viewed) end portions of the boss plate 1 and the other ends secured to an outer wheel member 4 of the steering wheel. Fittings 3 for attaching an air bag module, made by die casting, are secured to the respective spokes 2. However, the structure of this conventional steering wheel have the drawbacks referred to hereinbefore.

An improved steering wheel according to the present invention, which eliminates the drawbacks of the prior art, will be described below with reference to FIGS. 1 and 2.

Figure 1:
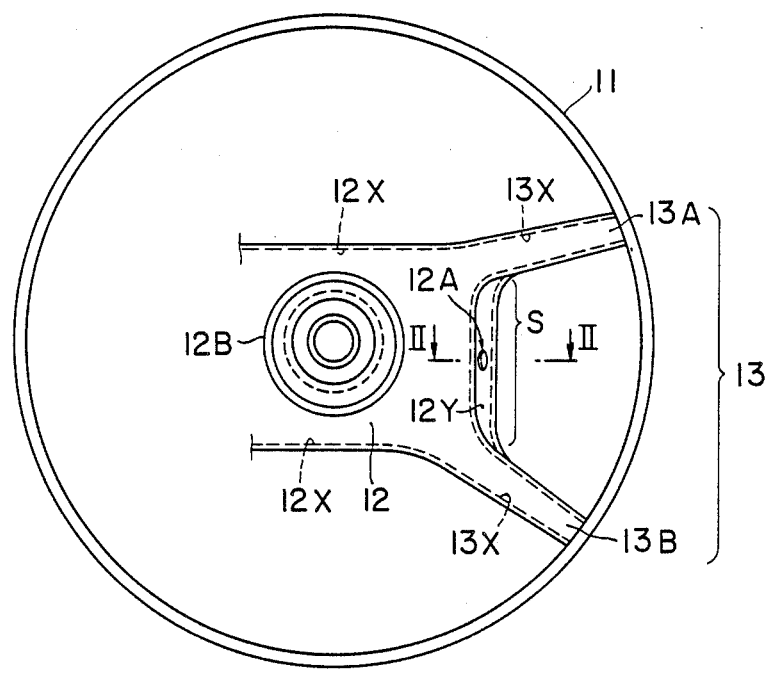
FIG. 1 is a front view, partly broken away, of a steering wheel of a vehicle, adapted for mounting of an air bag unit according to the present invention.
Figure 2:
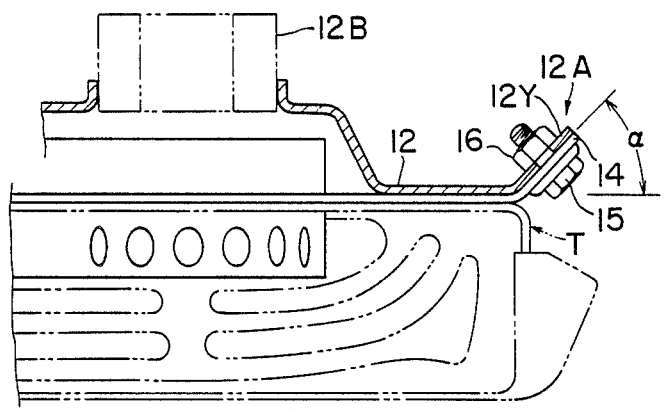
FIG. 2 is a cross sectional view on an enlarged scale, taken along the line II—II shown in FIG. 1.

Referring to FIG. 1, a steering wheel shown therein comprises an outer wheel member 11, a boss plate 12 arranged in a central hollow space of the wheel member 11, and spoke members 13 formed integrally with the boss plate 12 by sheet metal press. The boss plate 12 has a substantially rectangular or square outer configuration, and the spoke members 13A and 13B extend from the respective end corner portions of each side of the boss plate 12 towards the wheel member 11 and are secured thereto so as to show a generally H-shaped front configuration.

The boss plate 12 and the spoke members 13 are provided with continuous upper and lower flanges 12X and 13X along the upper and lower edges thereof for the purpose of improving the strength and rigidity of the boss plate and the spoke members.

The boss plate 12 is further provided with side flanges 12Y along the lateral side edges thereof. Each of the flange portions 12Y is located between the base portions of the upper and lower spokes members 13A and 13B as indicated by a letter S. The side flanges 12Y has dimensions different from those of the flange portion 12X, and the width of the former is larger than that of the latter. As shown in FIG. 2, the flanges 12Y is directed obliquely rearwards with respect to the major plane of the boss plate 12. More specifically, the flanges 12Y is rearwardly bent at an angle of about 45 degrees with respect to the major plane of the boss plate 12 as an air bag module mounting portion 12A provided with a hole or holes for installing an air bag module T of known type.

A boss 12B is formed at the central portion of the boss plate 12 for mounting the steering wheel on a steering column not shown. The air bag module T is accommodated within a case to form an air bag unit, the case having flange portions 14 which are secured to the respective flanges 12Y of the boss plate 12 by means of a bolt 15 and a nut 16. The air bag unit is fixed in front of the boss plate 12 as shown in FIG. 2.

As described above, in the steering wheel with an air bag unit according to the present invention, (a) stiffness of the boss plate and the spoke members is improved, (b) the boss plate and the spoke members are light, and (c) accessibility to the front side of the steering wheel makes it easy to install the air bag module and to check the installation because the side flanges are bent rearwardly with an angle against the boss plate While the presently preferred embodiment of the present invention has been shown and described, it is to be understood that this disclosure is for the purpose of illustration and that various changes and modifications may be made without departing from the scope of the invention as set forth in the appended claims

What is claimed is:

1. A steering wheel for a vehicle adapted to mount an air bag unit comprising:
    an outer wheel member;
    a boss plate having a substantially rectangular outer configuration and providing upper and lower flanges along the upper and lower edges thereof and a pair of side flanges along the lateral side edges thereof;
    said side flanges being angularly rearwardly bent behind the major plane of said boss plate;
    a plurality of spoke members connecting said boss plate and said outer wheel member and having flange portions along the length thereof; and
    means for mounting said air bag unit on said side flanges of said boss plate.

2. The steering wheel according to claim 1, wherein each of said side flanges forms an angle of about 45° relative to the major plane of the boss plate.

3. The steering wheel according to claim 1, wherein said means for mounting the air bag unit are a hole formed in the side flange, a bolt and a nut.

4. The steering wheel according to claim 1, wherein said boss plate and spoke members are integrally formed of a sheet metal.

5. A steering wheel for a vehicle adapted to mount an air bag unit comprising:
    an outer wheel member;
    a boss plate arranged in a center hollow space of said outer wheel member and mounted on a steering shaft;
    a plurality of spoke members formed integrally with said boss plate and secured to said outer wheel member respectively;
    said boss plate having upper and lower flanges along the upper and lower edges thereof and side flanges along the lateral side edges thereof, each of side flanges having a width larger than that of said upper and lower flanges and being angularly rearwardly bent behind said boss plate; and
    means for mounting said air bag unit on said side flanges of said boss plate, whereby the stiffness of the boss plate and the spoke members is increased without increasing the weight of the steering wheel.

6. The steering wheel according to claim 5, wherein said spoke members have respective flange portions along the length thereof, said flange portions being continuously connected with one of said upper and lower flanges.

7. The steering wheel according to claim 5, wherein each of said side flanges forms an angle of about 45° relative to the major plane of the boss plate.

8. The steering wheel according to claim 5, wherein said means for mounting the air bag unit are a hole formed in the side flange, a bolt and a nut.

9. The steering wheel according to claim 5, wherein said plurality of spoke members is formed integrally with said boss plate by pressed sheet metal.

10. The steering wheel according to claim 5, wherein said side flanges are provided between a pair of adjoining spoke members.

11. The steering wheel according to claim 5, wherein said boss plate has a substantially rectangular outer configuration.

* * * * *